(12) United States Patent
Araki et al.

(10) Patent No.: US 9,829,046 B2
(45) Date of Patent: Nov. 28, 2017

(54) TOLERANCE RING

(71) Applicant: NHK Spring Co., Ltd., Yokohama-shi (JP)

(72) Inventors: Toshimitsu Araki, Kanagawa (JP); Mitsuteru Mimura, Kanagawa (JP); Norihiro Tajima, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 402 days.

(21) Appl. No.: 14/378,056

(22) PCT Filed: Feb. 15, 2013

(86) PCT No.: PCT/JP2013/053758
§ 371 (c)(1),
(2) Date: Aug. 11, 2014

(87) PCT Pub. No.: WO2013/122229
PCT Pub. Date: Aug. 22, 2013

(65) Prior Publication Data
US 2015/0003771 A1 Jan. 1, 2015

(30) Foreign Application Priority Data

Feb. 17, 2012 (JP) ................................. 2012-033340

(51) Int. Cl.
*F16C 35/02* (2006.01)
*G11B 5/48* (2006.01)
(Continued)

(52) U.S. Cl.
CPC .............. *F16C 35/02* (2013.01); *F16C 27/02* (2013.01); *G11B 5/4813* (2013.01);
(Continued)

(58) Field of Classification Search
CPC ......... Y10T 403/7047; Y10T 403/7061; F16D 7/02; F16B 2/24; F16B 2/241
See application file for complete search history.

(56) References Cited

U.S. PATENT DOCUMENTS 3,061,386 A * 10/1962 Dix .......................... F16C 27/04
29/898.07
4,981,390 A * 1/1991 Cramer, Jr. ........... F16D 1/0835
403/355
(Continued)

FOREIGN PATENT DOCUMENTS

CN 1402871 A 3/2003
CN 101255884 A 9/2008
(Continued)

OTHER PUBLICATIONS

Office Action dated May 17, 2016, issued for the Japanese patent application No. 2013-558761 and English translation thereof.
(Continued)

*Primary Examiner* — Michael P Ferguson
(74) *Attorney, Agent, or Firm* — Locke Lord LLP

(57) ABSTRACT

A tolerance ring includes a base formed of a strip-like member approximately wound around into a ring shape, and a plurality of projections provided along a winding direction of the base so as to protrude in a radial direction from an outer peripheral surface of the base, wherein each of the projections has edges serving as a boundary with the base and at least one of the edges in a width direction orthogonal to the winding direction has a shape intersecting the winding direction.

11 Claims, 18 Drawing Sheets

(51) Int. Cl.
*G11B 5/55* (2006.01)
*F16C 27/02* (2006.01)
F16C 17/02 (2006.01)

(52) U.S. Cl.
CPC ............ *G11B 5/5569* (2013.01); *F16C 17/02* (2013.01); *F16C 2370/12* (2013.01)

(56) References Cited

U.S. PATENT DOCUMENTS

| | | | |
|---|---|---|---|
| 5,315,465 | A | 5/1994 | Blanks |
| 6,288,878 | B1 | 9/2001 | Misso et al. |
| 6,333,839 | B1 | 12/2001 | Misso et al. |
| 7,850,389 | B2 * | 12/2010 | Hanrahan ............... F16C 27/00 360/265.6 |
| 7,922,418 | B2 * | 4/2011 | Baker ..................... F16C 11/04 360/265.2 |
| 8,385,024 | B2 * | 2/2013 | Schmidt ............... G11B 5/4813 360/265.6 |
| 8,684,624 | B2 | 4/2014 | Slayne |
| 2006/0275076 | A1 | 12/2006 | Hanrahan et al. |
| 2010/0003076 | A1 | 1/2010 | Slayne |

FOREIGN PATENT DOCUMENTS

| | | |
|---|---|---|
| CN | 101294593 A | 10/2008 |
| CN | 102016337 A | 4/2011 |
| CN | 102124241 A | 7/2011 |
| EP | 1184583 A1 | 3/2002 |
| EP | 1731783 A2 | 12/2006 |
| JP | 05-205413 A | 8/1993 |
| JP | 2002-130310 A | 5/2002 |
| JP | 2003-139154 A | 5/2003 |
| JP | 2003-518592 A | 6/2003 |
| JP | 2003-522912 A | 7/2003 |
| JP | 2005-105781 A | 4/2005 |
| JP | 2006-095120 A | 4/2006 |
| JP | 2007-305268 A | 11/2007 |
| JP | 4027664 B2 | 12/2007 |
| JP | 2011-526669 A | 10/2011 |
| WO | WO-01/41136 A1 | 6/2001 |
| WO | WO-2010/001221 A1 | 1/2010 |

OTHER PUBLICATIONS

International Search Report dated Mar. 19, 2014, issued for PCT/JP2013/053758.
Office Action dated Jul. 18, 2016, issued for the Chinese patent application No. 201380009441.1.
Office Action dated Nov. 4, 2015, issued for the corresponding Chinese Patent Application No. 201380009441.1 and English translation thereof.

* cited by examiner

TOLERANCE RING

FIELD

The present invention relates to a tolerance ring for use in hard disk devices or other applications.

BACKGROUND

Hard disk devices have conventionally been used in information processing equipment such as computers. Hard disk devices are now mounted not only as external storage devices for computers but also in home appliances such as televisions and camcorders, and automotive electronics.

A conventional hard disk device 200 illustrated in FIG. 27 has a drive mechanism housed in a casing body 201. The drive mechanism has a spindle 203 that rotatably drives a hard disk 202 as a recording medium (the spindle is rotated by a motor not-shown in the drawing), a carriage 205 that supports a magnetic head 204 recording information and reading information on/from the hard disk 202 and pivots over a surface of the hard disk 202, a VCM (Voice Coil Motor) 206 that allows the carriage 205 to precisely pivot to control scan with the magnetic head 204, a pivot shaft 207 that is fixed to the casing body 201 and joins the casing body 201 to the carriage 205, and a tolerance ring 208 that fixes the carriage 205 and the pivot shaft 207 to each other. The pivot shaft 207 is, for example, approximately shaped like a column and has a structure of a bearing.

The carriage 205 pivots about the pivot shaft 207 as the center axis over the surface of the hard disk 202. The carriage 205 is fixed to the pivot shaft 207 with the tolerance ring 208 interposed therebetween, thereby preventing motive power exerted to pivot the carriage 205 by the VCM 206 from being transferred to the casing body 201.

The conventional tolerance ring, for example, as the tolerance ring 208 illustrated in FIG. 28, has a plurality of projections 208b (contact portions) on the outer peripheral surface of a base 208a formed of a flat plate-shaped member approximately wound around in a predetermined direction into a ring shape, the projections 208b each protruding to be convex from an approximately rectangular region along the outer edge of the flat plate. After the tolerance ring 208 is inserted into an opening in the carriage 205, the pivot shaft 207 is press-fitted into the inside of the tolerance ring 208.

As such a tolerance ring, a tolerance ring having a plurality of convex contact portions protruding on the outer peripheral side is disclosed (see, for example, Patent Literatures 1 to 5). In the tolerance ring disclosed in Patent Literatures 1 to 5, the contact portions are in pressure-contact with the side surface of one of the carriage 205 and the pivot shaft 207 to fix the carriage 205 and the pivot shaft 207 to each other. The contact portions of the tolerance ring disclosed in Patent Literature 5 are shaped like a rounded curve in the cross section cut along the plane orthogonal to the main surface of the tolerance ring.

CITATION LIST

Patent Literature

Patent Literature 1: Japanese Laid-open Patent Publication No. 5-205413
Patent Literature 2: Publication of Japanese Translation of PCT Application No. 2003-522912
Patent Literature 3: Japanese Laid-open Patent Publication No. 2002-130310
Patent Literature 4: Japanese Laid-open Patent Publication No. 2007-305268
Patent Literature 5: Japanese Patent No. 4027664

SUMMARY

Technical Problem

When the pivot shaft 207 is press-fitted (inserted) in the inner peripheral side of the conventional tolerance ring 208, as illustrated by the graph in FIG. 29, the insertion load changes with displacement in the insertion direction. Here, a region R811 in the graph indicates a region where the projection 208b is formed. Here, in a state in which the pivot shaft 207 is inserted, when the pivot shaft 207 is located on the front end side of the projection 208b in the insertion direction, the insertion load locally increases (this load is hereinafter called "peak load").

When the pivot shaft 207 is press-fitted in the tolerance ring 208, the tolerance ring 208 is deformed in accordance with the load from the pivot shaft 207. Here, as illustrated in FIG. 30, the deformation of the tolerance ring 208 may cause the front end of the pivot shaft 207 in the insertion direction (the arrow direction in the drawing) to intrude into the inside of the projection 208b. If the press-fitting further continues in this state, the front end of the pivot shaft 207 comes into contact (linear contact) with the base end of the projection 208b and becomes caught, causing the peak load as described above. Because of this peak load, a locally large load is applied to the contact wall surface between the pivot shaft 207 and the tolerance ring 208 to damage the wall surface and/or the pivot shaft 207, possibly causing contamination.

Here, although the technique described in Patent Literature 5 can decrease the peak load described above, the insertion load after completion of the press-fitting also decreases. It is preferable that the insertion load be greater in a design range because it is a load applied to fix the pivot shaft and the tolerance ring after completion of the press-fitting. With the tolerance ring in Patent Literature 5, therefore, the fixed state between the pivot shaft 207 and the tolerance ring 208 may become unstable.

The present invention is made in view of the foregoing and aims to provide a tolerance ring in which a peak load can be suppressed when a pivot shaft is press-fitted into the tolerance ring, while the load applied to the pivot shaft by the tolerance ring can be maintained in a state in which the tolerance ring and the pivot shaft are fixed to each other.

Solution to Problem

To solve the above-described problem and achieve the object, a tolerance ring according to the present invention includes a base formed of a strip-like member approximately wound around into a ring shape, and a plurality of projections provided along a winding direction of the base so as to protrude in a radial direction from an outer peripheral surface of the base, wherein each of the projections has edges serving as a boundary with the base and at least one of the edges in a width direction orthogonal to the winding direction has a shape intersecting the winding direction.

Moreover, in the above-described tolerance ring according to the present invention, the edge of the projection in the winding direction is formed in a linear shape.

Moreover, in the above-described tolerance ring according to the present invention, the projection has different kinds of shapes between a cross section cut along a plane vertical to a main surface of the base and parallel to the winding direction and a cross section cut along a plane vertical to the main surface of the base and parallel to the width direction.

Moreover, in the above-described tolerance ring according to the present invention, the projection includes a strip portion shaped like a strip, extending in the winding direction or the width direction, and curved to be convex in the radial direction, and joint portions approximately shaped like a flat plate and each joining an end in a direction vertical to a direction in which the strip portion extends to the main surface of the base.

Moreover, in the above-described tolerance ring according to the present invention, the edge of the projection in the winding direction is formed in a linear shape orthogonal to the winding direction.

Moreover, in the above-described tolerance ring according to the present invention, the projection has a symmetric shape with respect to a plane passing through center of the projection and parallel to the winding direction.

Moreover, in the above-described tolerance ring according to the present invention, a maximum width of the projection in the winding direction is larger in a plate-shaped flat surface than a maximum width in a direction vertical to the winding direction.

Moreover, in the above-described tolerance ring according to the present invention, a radius of curvature at an end in the winding direction of the base is smaller than a radius of curvature at a part other than the end in the winding direction.

Moreover, in the above-described tolerance ring according to the present invention, the radius of curvature continuously reduces in a direction from the part other than the end toward the end.

Moreover, the above-described tolerance ring according to the present invention includes a notch cut in the width direction from at least one of ends in the width direction of the base.

Moreover, in the above-described tolerance ring according to the present invention, one or more notches are provided at the one end.

Moreover, in the above-described tolerance ring according to the present invention, of the projections arranged along the winding direction, number of the projections arranged in a row is a multiple of three.

Moreover, in the above-described tolerance ring according to the present invention, the projections form a plurality of rows along the winding direction.

Advantageous Effects of Invention

The present invention provides a tolerance ring including a base formed of a strip-like member approximately wound around into a ring shape and a plurality of projections provided along the winding direction of the base so as to protrude in a radial direction from an outer peripheral surface of the base. Each of the projections has edges serving as a boundary with the base and at least one of the edges in a width direction orthogonal to the winding direction has a shape intersecting the winding direction. The present invention thereby achieves the effects of suppressing the peak load when a pivot shaft is press-fitted into the tolerance ring and maintaining the load applied to the pivot shaft by the tolerance ring in a state in which the tolerance ring and the pivot shaft are fixed to each other.

DESCRIPTION OF EMBODIMENTS

Figure 1:
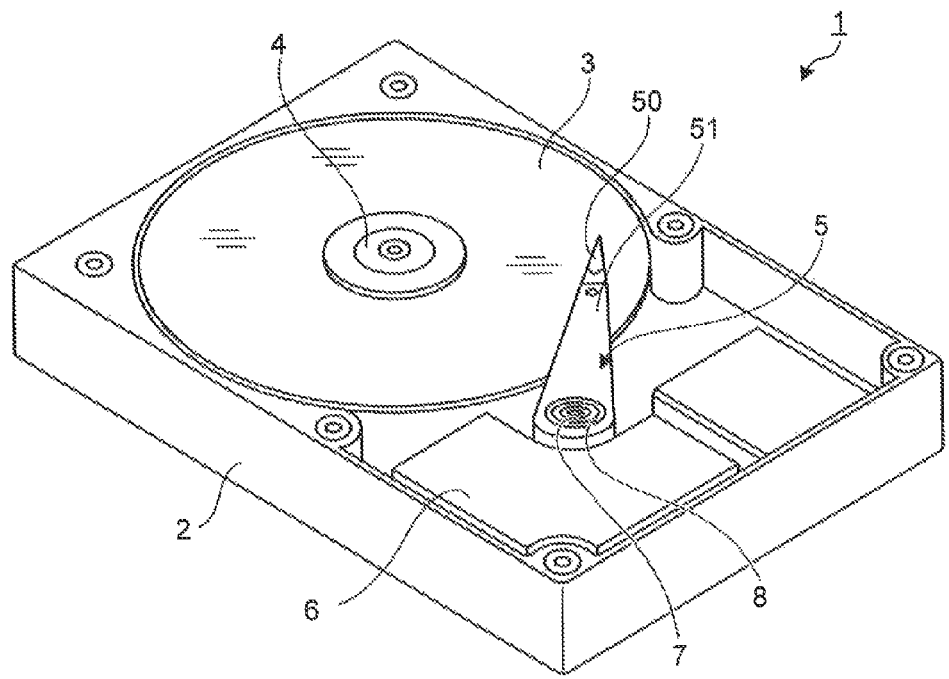
FIG. 1 is a perspective view illustrating the overall configuration of a hard disk device according to an embodiment of the present invention.

Embodiments for carrying out the present invention will be described in details below in conjunction with the drawings. It should be noted that the following embodiments do not limit the present invention. The drawings referred to in the following description only schematically illustrate the shape, size, and positional relation to such an extent that the contents of the present invention can be understood. That is, the present invention is not limited only to the shape, size, and positional relation illustrated in the drawings. In the following description, a hard disk device will be described as an application of the tolerance ring.

FIG. 1 is a perspective view illustrating the overall configuration of a hard disk device according to an embodiment of the present invention. The hard disk device 1 illustrated in FIG. 1 has a drive mechanism housed in a casing body 2. The drive mechanism includes a spindle 4 that rotatably drives a hard disk 3 as a recording medium, a carriage 5 that supports a magnetic head unit 50 recording information and reading information on/from the hard disk 3 and pivots over a surface of the hard disk 3, a VCM 6 that allows the carriage 5 to precisely pivot to control scan with the magnetic head unit 50, a column-shaped pivot shaft 7 that is fixed to the casing body 2 to join the casing body 2 to the carriage 5, and a tolerance ring 8 that fixes the carriage 5 and the pivot shaft 7 to each other. The pivot shaft 7 is, for example, approximately shaped like a column and has a structure of a bearing.

Figure 2:
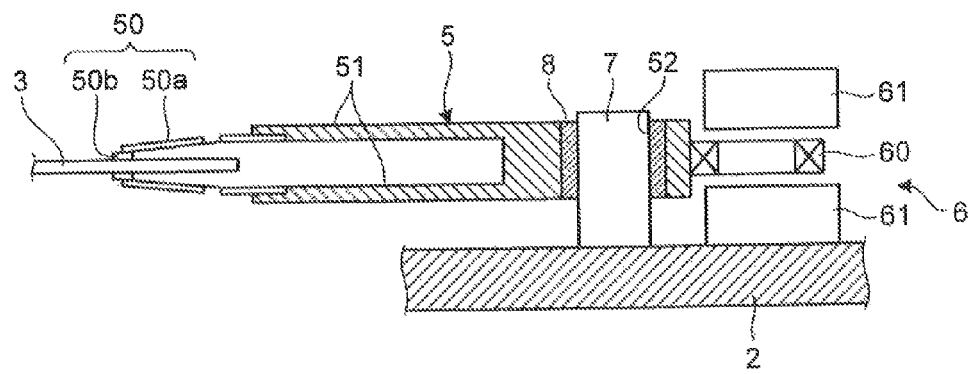
FIG. 2 is a partial cross-sectional view illustrating the configuration of the main part of the hard disk device illustrated in FIG. 1.
Figure 3:
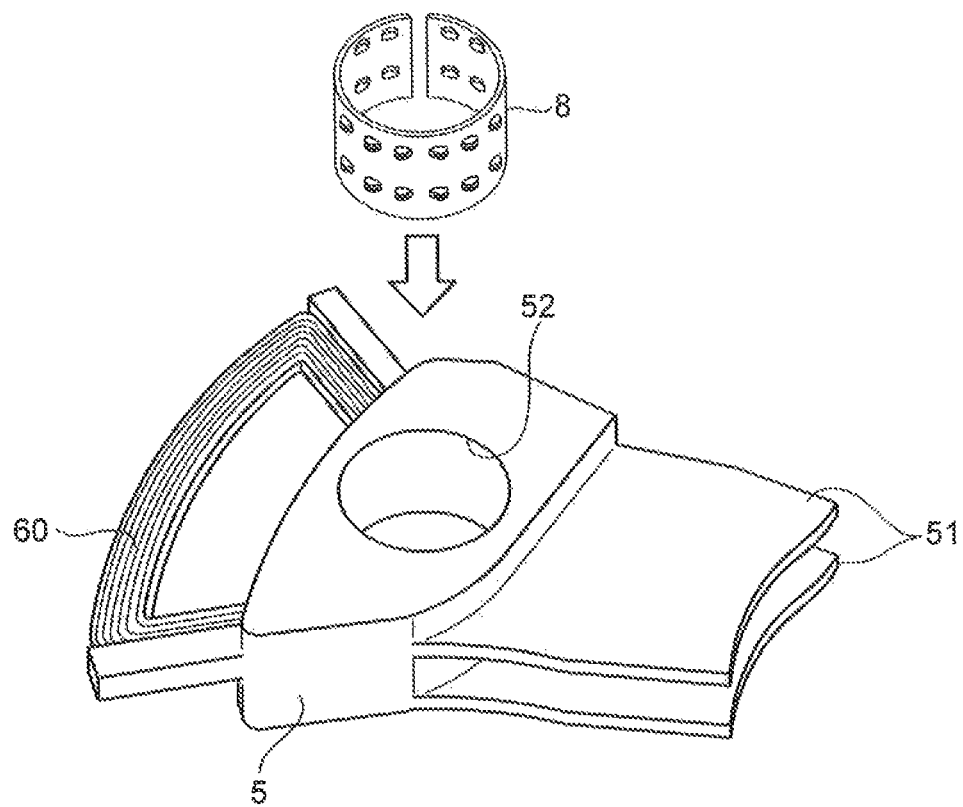
FIG. 3 is a perspective view illustrating the configuration of the main part of the hard disk device illustrated in FIG. 1.

FIG. 2 is a partial cross-sectional view illustrating the configuration of the main part of the hard disk device 1 illustrated in FIG. 1. FIG. 3 is a perspective view illustrating the configuration of the main part of the hard disk device 1 illustrated in FIG. 1. The carriage 5 has an arm 51 that extends over the surface of the hard disk 3 and holds the magnetic head unit 50 at a front end thereof, and a joint portion 52 that is joined to the pivot shaft 7 and has a column-shaped hollow space having a cross section with a diameter slightly larger than the diameter of the cross section of the pivot shaft 7. As illustrated in FIG. 2, the magnetic head unit 50 has a suspension 50a that is floated from the surface of the hard disk 3 by the air flow produced by rotation of the hard disk 3, and a magnetic head 50b provided at an end of the suspension 50a on the side different from the side connected to the arm 51 to record and read information. When the hard disk device 1 has a plurality of hard disks 3, the carriage 5 has a plurality of magnetic head units 50 depending on the number of hard disks 3.

The VCM 6 has a coil 60 joined to the end side different from the arm 51 side and two magnets 61 having the coil 60 sandwiched therebetween. The VCM 6 drives the carriage 5 with power produced by current and magnetic field flowing through the coil 60. The carriage 5 then pivots about the center of the pivot shaft 7 as the center axis over the surface of the hard disk 3 with the motive power from the VCM 6 and allows the magnetic head unit 50 to pivot over the surface of the hard disk 3.

Here, the tolerance ring 8 is used to fix the carriage 5 and the pivot shaft 7 to each other. The tolerance ring 8 is inserted into the hollow space of the joint portion 52 of the carriage 5 and receives the pivot shaft 7 press-fitted in the inside thereof, thereby fixing the carriage 5 and the pivot shaft 7 to each other. Here, the carriage 5 is pivotably fixed around the center axis in the longitudinal direction of the pivot shaft 7 as a bearing. The fixing of the carriage 5 to the pivot shaft 7 prevents the motive power exerted to pivot the carriage 5 by the VCM 6 from being transferred to the casing body 2.

Figure 4:
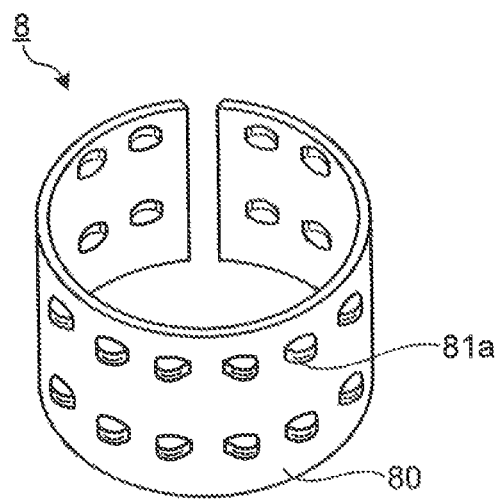
FIG. 4 is a perspective view illustrating the configuration of a tolerance ring in the hard disk device illustrated in FIG. 1.
Figure 5:
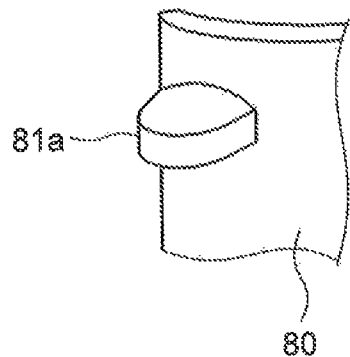
FIG. 5 is a perspective view illustrating the configuration of the main part of the tolerance ring in the hard disk device illustrated in FIG. 1.

FIG. 4 is a perspective view illustrating the configuration of the tolerance ring 8. FIG. 5 is a perspective view illustrating the configuration of the main part of the tolerance ring 8. The tolerance ring 8 has a base 80 formed of stainless shaped like a plate and formed in an approximate ring shape in the direction in which the stainless is wound around, and a plurality of projections 81a provided along the winding direction of the base 80. The projection 81a protrudes in the radial direction on the outer peripheral surface of the base 80 of the tolerance ring 8. Here, the projection 81a has edges serving as a boundary with the base 80, among which the edge that faces at least one of ends (the outer edge of the base 80) of the base 80 in a width direction orthogonal to the winding direction is formed in an arc shape. The projection 81a protrudes in an approximately spherical shape from the outer edge of the approximately oval region. The tolerance ring 8 is shaped like a ring approximately wound around in a predetermined direction, which is the longitudinal direction of the plate-shaped stainless.

Figure 6:
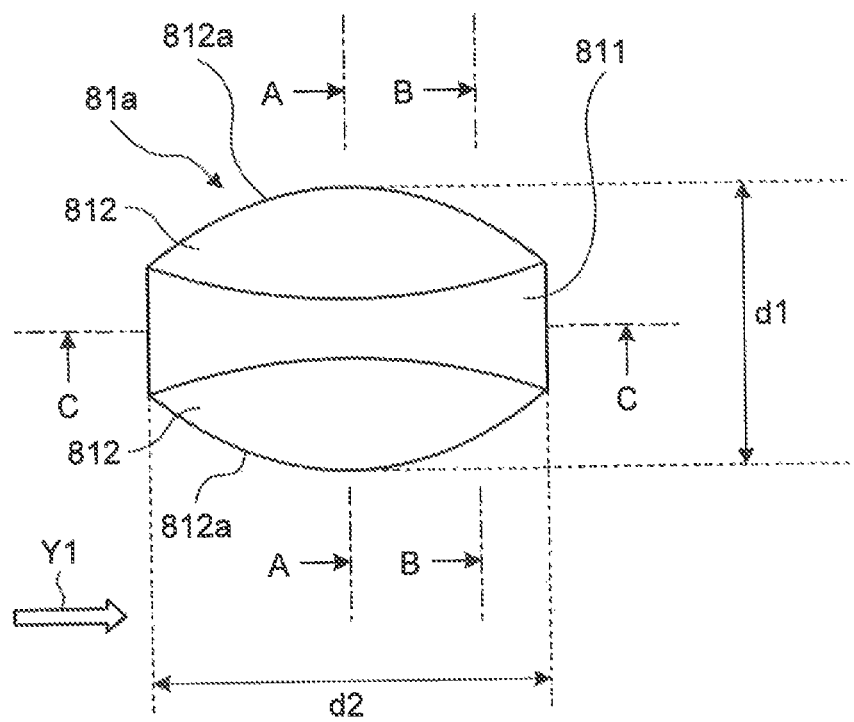
FIG. 6 is a plan view illustrating the configuration of the main part of the tolerance ring in the hard disk device illustrated in FIG. 1.

FIG. 6 is a plan view illustrating the configuration of the projection 81a of the tolerance ring 8 in the hard disk device 1 illustrated in FIG. 1. As illustrated in FIG. 6, the projection 81a has a strip portion 811 that is shaped like a strip having a width reduced toward the center, extends in the winding direction, and is curved to be convex in the radial direction of the tolerance ring 8, and joint portions 812 that are approximately shaped like a flat plate and each join the end in the direction vertical to the direction in which the strip portion 811 extends to the main surface of the tolerance ring 8. Here, an edge 812a of the joint portion 812 on the tolerance ring 8 side (the boundary with the base 80) is formed in an arc shape convex on the side different from the strip portion 811 side. The outer edge (the edge in the winding direction) of the strip portion 811 on the main surface side (the side continuous with the main surface) of the tolerance ring 8 (the base 80) is formed in a linear shape in the direction orthogonal to the winding direction. Here, the projection 81a has a symmetric shape with respect to the plane passing through the center of the projection 81a and parallel to the winding direction.

The projection 81a of the tolerance ring 8 according to the present embodiment satisfies the relation d1<d2, where d1 is the maximum width in the direction vertical to the winding direction (arrow Y1) and d2 is the maximum width of the length parallel to the winding direction. With this, even when the width (the height of the tolerance ring 8) in the direction orthogonal to the winding direction of the tolerance ring 8 is short, the projections 81*a* can be arranged in a plurality of rows in this orthogonal direction, and the projections 81*a* can be brought into contact with each other in the longitudinal direction of the pivot shaft 7, whereby inclination of the center axis in the longitudinal direction of the pivot shaft 7 is prevented more reliably.

Figure 7:
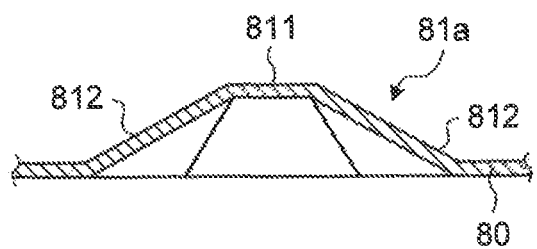
FIG. 7 is a cross-sectional view along line A-A in FIG. 6.
Figure 8:
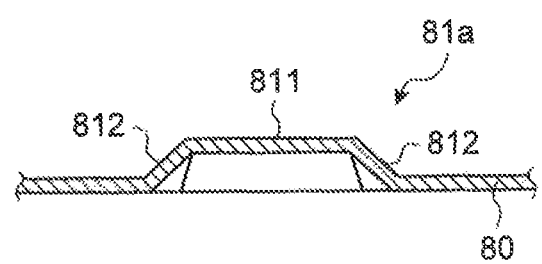
FIG. 8 is a cross-sectional view along line B-B in FIG. 6.
Figure 9:
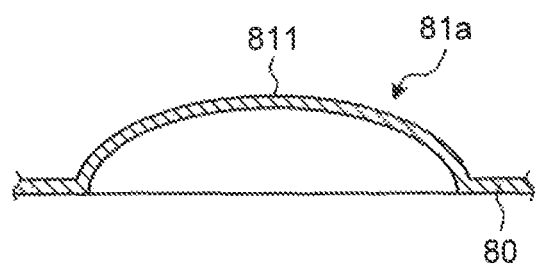
FIG. 9 is a cross-sectional view along line C-C in FIG. 6.

FIG. 7 is a cross-sectional view along line A-A in FIG. 6. FIG. 8 is a cross-sectional view along line B-B in FIG. 6. FIG. 9 is a cross-sectional view along line C-C in FIG. 6. The cross section cut along a plane vertical to the main surface of the tolerance ring 8 (the base 80) and vertical to the winding direction has a trapezoidal shape as illustrated in FIGS. 7 and 8. Here, the cross section at the center of the projection 81*a* and the cross section at the end side thereof are different in the top base, bottom base, and height of the trapezoid. As described above, of the cross sections cut along the plane vertical to the main surface of the tolerance ring 8 (the base 80) and parallel to the winding direction, the cross section at the center of the projection 81*a* protrudes from the main surface of the base 80 in an approximately arc shape as illustrated in FIG. 9. In this manner, the projection 81*a* has different kinds of shapes between the cross section cut along the plane vertical to the main surface of the base 80 and parallel to the winding direction and the cross section cut along the plane vertical to the main surface of the base 80 and parallel to the width direction orthogonal to the winding direction. The kinds in this specification refer to shapes such as arc, trapezoidal, and corrugated shapes.

The projections 81*a* are provided in two rows along the winding direction of the tolerance ring 8. After the tolerance ring 8 is inserted into the opening in the carriage 5, the pivot shaft 7 is press-fitted in the inside of the tolerance ring 8. Here, the projections 81*a* come into pressure contact with the inner wall surface of the joint portion 52 of the carriage 5 and fixes the carriage 5 and the pivot shaft 7 to each other. The length in the winding direction of the tolerance ring 8 is preferably equal to the length of the outer periphery of the opening of the joint portion 52. The projection 81*a* may protrude in the direction toward the inner peripheral side along the radial direction. Although two rows are provided along the winding direction of the tolerance ring 8 in the present embodiment, one row or three or more rows may be provided.

Figure 10:
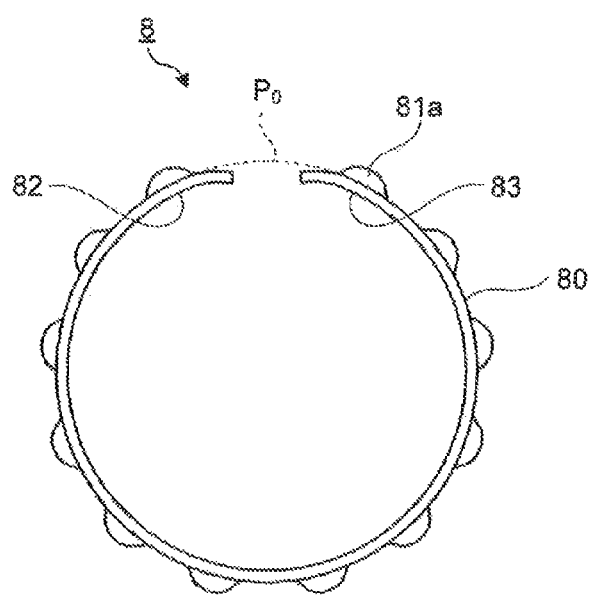
FIG. 10 is a side view illustrating the configuration of the tolerance ring in the hard disk device illustrated in FIG. 1.

FIG. 10 is a side view illustrating the configuration of the tolerance ring 8. In the tolerance ring 8, as illustrated in the side view in FIG. 10, the radius of curvature at ends 82, 83 in the winding direction has a value different from the radius of curvature at the part other than the ends 82, 83 in the winding direction. Specifically, the radius of curvature at the ends 82, 83 in the winding direction is equal to the radius of curvature of the joint portion 52 of the carriage 5. The radius of curvature at the part other than the ends 82, 83 in the winding direction is larger than the radius of curvature of the joint portion 52 of the carriage 5. In FIG. 10, the broken line P₀ shows the circular shape (the shape of the circumscribed circle) of the radius of curvature at the part other than the ends 82, 83 in the winding direction. In this way, when the open ends 82, 83 are closed during insertion into the joint portion 52 of the carriage 5, the shape of the tolerance ring 8 along the winding direction can be formed into a circle having a radius of curvature approximately equal to the radius of curvature of the joint portion 52. Here, the tolerance ring 8 is curved such that the radius of curvature continuously reduces in the direction from the part other than the ends 82, 83 toward the ends 82, 83.

Figure 11:
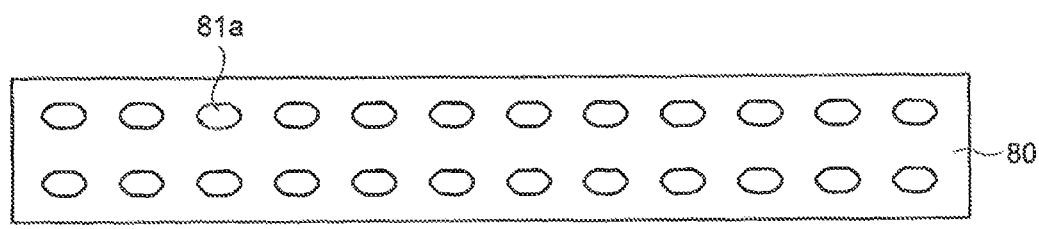
FIG. 11 is a developed view schematically illustrating the configuration of the tolerance ring in the hard disk device illustrated in FIG. 1.

FIG. 11 is a developed view schematically illustrating the configuration of the tolerance ring 8 in the hard disk device 1 illustrated in FIG. 1, in which the tolerance ring 8 is developed in the winding direction. As illustrated in FIG. 11, the present embodiment will be described assuming that 12 projections 81*a* are arranged in a row. The projections 81*a* of the tolerance ring 8 are arranged along the longitudinal direction of the main surface of the base 80.

Here, the number of projections 81*a* arranged is a multiple of three. The projections 81*a* arranged in a multiple of three come into contact the abutment surface symmetrically at 120°, so that the load applied on the side surface of the joint portion 52 generally becomes uniform, thereby keeping the operation efficiency of the bearing with high accuracy.

Figure 12:
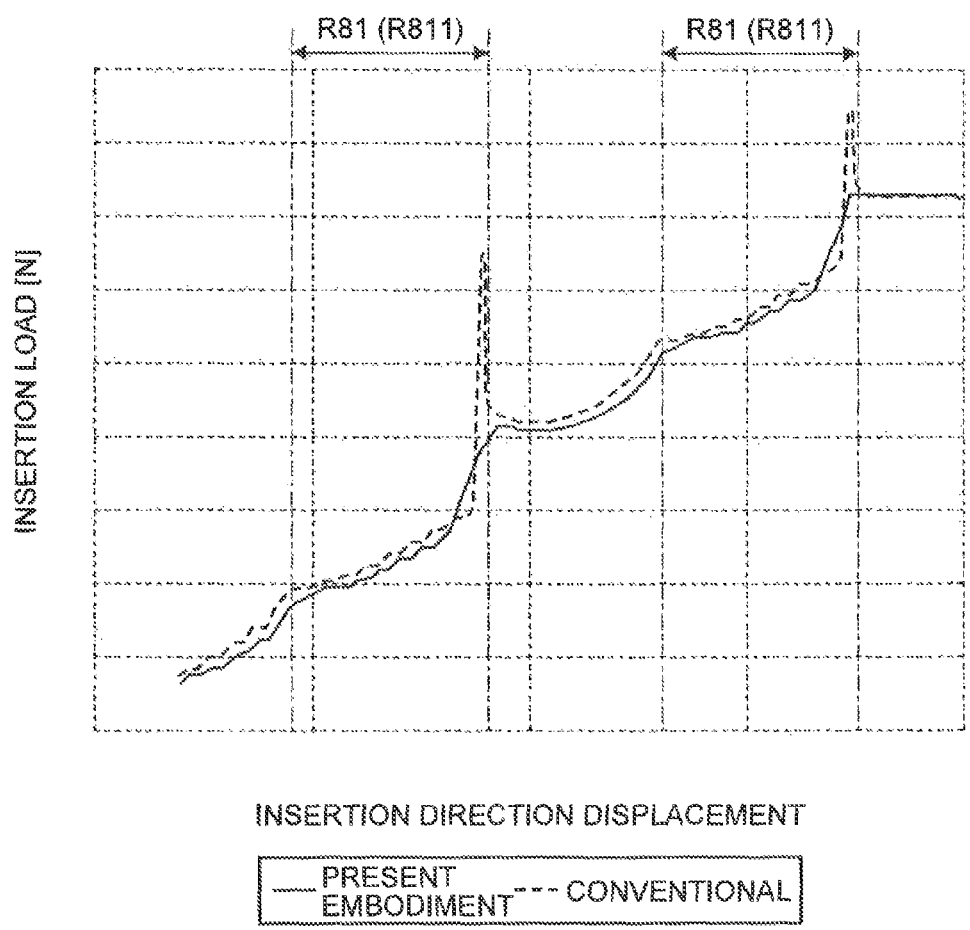
FIG. 12 is a graph illustrating a relation between displacement in the insertion direction and insertion load during insertion of the pivot shaft into the tolerance ring in the hard disk device according to the embodiment of the present invention and during insertion of the pivot shaft into the tolerance ring in the conventional example.

FIG. 12 is a graph illustrating a relation between displacement in the insertion direction and insertion load produced at that time, during insertion of the pivot shaft 7 into the tolerance ring 8 in the hard disk device 1 according to the present embodiment and during insertion of the pivot shaft 207 into the tolerance ring 208 in the conventional example. When the pivot shaft 7 is press-fitted into the tolerance ring 8 as described above and when the pivot shaft 207 is press-fitted in the conventional tolerance ring 208, the insertion load in each case increases with the displacement of the pivot shaft in the insertion direction.

Here, as described above, in the conventional tolerance ring 208, when the pivot shaft 207 is inserted into the tolerance ring 208 and approaches the front end in the insertion direction of the formation region R811 of the projection 208*b*, it becomes caught, causing a peak load. By contrast, in the tolerance ring 8 according to the present embodiment, no peak load is produced in the formation region R81 of the projections 81*a*, and the insertion load continuously increases with the displacement in the insertion direction and thereafter becomes equivalent to the insertion load of the conventional tolerance ring 208. It is preferable that the insertion load be greater in a design range because it is a load exerted to fix the pivot shaft 7 and the tolerance ring 8 to each other after completion of press-fitting.

Figure 13:
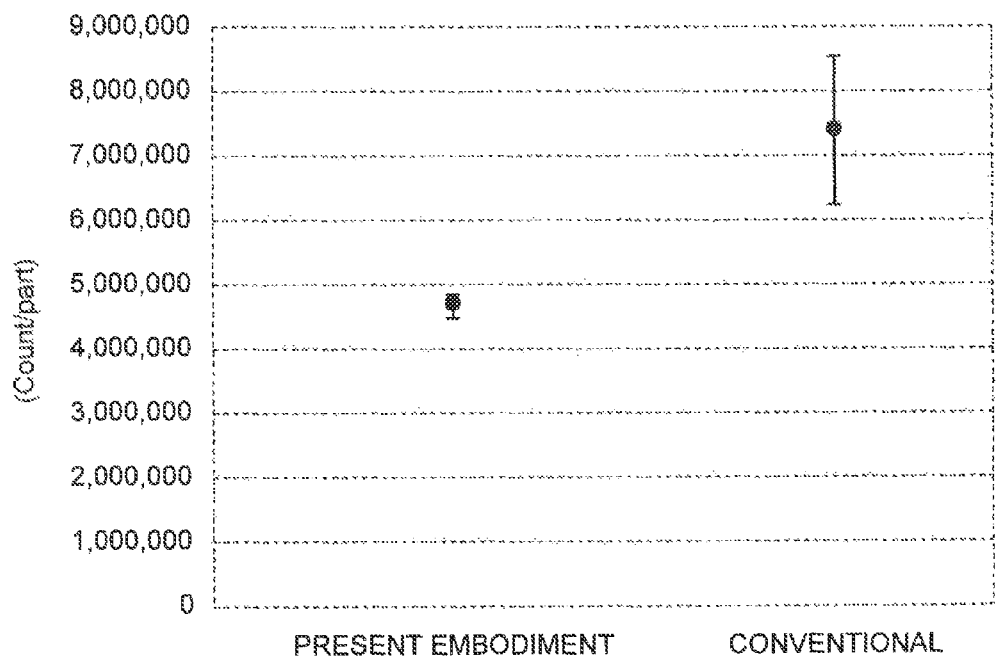
FIG. 13 is a graph illustrating a relation between the embodiment and the conventional example and the number of contaminants after insertion of the pivot shaft into the tolerance ring in the hard disk device according to the embodiment of the present invention and after insertion of the pivot shaft into the tolerance ring in the conventional example.

FIG. 13 is a graph illustrating a relation between the present embodiment and the conventional example and the number of contaminants after insertion of the pivot shaft into the tolerance ring in the hard disk device according to the present embodiment and after insertion of the pivot shaft into the tolerance ring in the conventional example. Here, the number of contaminants was counted as follows. After the pivot shaft 7 was press-fitted in the tolerance ring 8 inserted in the carriage 5, pure water was sprayed with a spray gun, and the number of contaminants included in the dripping pure water was counted. Meanwhile, after the pivot shaft 207 was press-fitted in the conventional tolerance ring 208 inserted in the carriage 205, pure water was also sprayed with a spray gun, and the number of contaminants included in the dripping pure water was counted. Here, the carriages 5, 205 and the pivot shafts 7, 207 are formed of the same material. The contaminants counted were those having a maximum particle diameter of 0.5 μm or more. The average value obtained from the same measurement performed three times is plotted.

As illustrated in the graph in FIG. 13, when the tolerance ring 8 according to the present embodiment is used, the number of contaminants is smaller than when the conventional tolerance ring 208 is used. When the tolerance ring 8 according to the present embodiment is used, the number of contaminants varies less than when the conventional tolerance ring 208 is used. It can be said that contamination resulting from the tolerance ring 8 is suppressed when the hard disk device 1 is assembled with the tolerance ring 8 according to the present embodiment.

In the tolerance ring 8 according to the present embodiment, one of the reasons why no peak load occurs is that the front end in the insertion direction of the pivot shaft 7 gradually comes into contact with the outer edge on the front end side of the projection 81a in the insertion direction and is press-fitted without being caught as in the conventional example in which the pivot shaft 207 comes into linear contact with the tolerance ring 208. This can suppress damage (contamination) to the wall surface of the pivot shaft 7 and the tolerance ring 8, resulting from the friction force produced between the pivot shaft and the tolerance ring due to the peak load.

The tolerance ring 8 can be fabricated, for example, by a method as follows. This fabrication method uses a transfer press in which predetermined press operations are successively performed on a base material extending like a strip. First, a contouring process is performed by a press on a base material extending like a flat plate. The outer shape (outer edge) of the tolerance ring 8 is thereby shaped to form a substrate having the outer shape of the tolerance ring 8. Here, a runner keeps the joined state between the substrate and the base material in order to prevent the substrate from separating from the base material. Next, a process of forming projections 81a is performed on the formed substrate. The projections 81a are formed by a press at the positions described above.

A curving process is then performed on the substrate having the projections 81a formed thereon. In this curving process, the substrate is gradually curved from both ends such that the projections 81a face on the outer surface side along the longitudinal direction of the main surface of the substrate, and the radius of curvature at the ends 82, 83 in the winding direction is formed to be smaller than the radius of curvature at the part other than the ends 82, 83 in the winding direction. Here, the substrate is preferably curved such that the radius of curvature continuously (gradually) reduces in the direction from the part other than the ends 82, 83 toward the ends 82, 83.

After the curving process is finished, a trimming process is performed on the resultant substrate. In the trimming process, the substrate is cut off from the runner to obtain the tolerance ring 8. After the trimming process, the resultant tolerance ring 8 may be subjected to a process of applying stress equal to or greater than the maximum use stress (setting process).

According to the present embodiment described above, in the projection 81a protruding in the radial direction from the main surface of the tolerance ring 8, the edge 812a in the width direction orthogonal to the winding direction of the tolerance ring 8 is formed in an arc shape, so that the peak load can be suppressed when the pivot shaft 7 is press-fitted into the tolerance ring 8, while the load applied to the pivot shaft 7 by the tolerance ring 8 can be maintained in a state in which the tolerance ring 8 and the pivot shaft 7 are fixed to each other. The present embodiment also can suppress damage (contamination) to the wall surface of the pivot shaft 7 and/or the tolerance ring 8 due to the peak load.

According to the present embodiment as described above, the radius of curvature at the ends 82, 83 in the winding direction is equal to the radius of curvature of the joint portion 52 of the carriage 5, and the radius of curvature at the part other than the ends 82, 83 in the winding direction is larger than the radius of curvature of the joint portion 52 of the carriage 5, so that the tolerance ring 8 can be retained in the inside of the joint portion 52 when being inserted in the joint portion 52 of the carriage 5, and the shape in the winding direction of the tolerance ring 8 can be formed into a circle along the wall surface of the joint portion 52. When being inserted into the joint portion 52 of the carriage 5, the tolerance ring 8 therefore can be inserted without damaging the wall surface of the joint portion 52. This can suppress contamination due to the insertion of the tolerance ring 8.

In the conventional tolerance ring, the shape along the winding direction is elastically deformable into an approximately circular shape generally equal to the opening in the carriage. In practice, however, the radius of curvature of the tolerance ring is designed to be larger than the radius of curvature of the opening in the carriage because the tolerance ring has to be retained in the carriage in the operation during assembly. In production, the tolerance ring may be opened on the end sides, and the radius of curvature at the ends of the tolerance ring may be larger than the radius of curvature of the opening in the carriage. The shape along the winding direction of the elastically deformed tolerance ring is thus formed into an oval shape during insertion into the opening in the carriage. Therefore, when the pivot shaft is press-fitted into the inside of the tolerance ring, the side surface of the pivot shaft comes into contact with the outer edge on the short diameter side of the oval shape of the tolerance ring to damage the outer edge of the tolerance ring and/or the side surface of the pivot shaft, possibly causing contamination.

By contrast, the shape along the winding direction of the tolerance ring 8 according to the present embodiment is circular along the wall surface of the joint portion 52, so that the tolerance ring 8 can be inserted into the joint portion 52 without damaging the wall surface of the joint portion 52. When the pivot shaft 7 is press-fitted, the pivot shaft 7 can be press-fitted without damaging the inner peripheral surface of the tolerance ring 8 and the side surface of the pivot shaft 7. This can suppress contamination due to the tolerance ring 8 even more reliably.

As described above, in the tolerance ring 8 according to the present embodiment, the pivot shaft 7 can be easily press-fitted into the inside of the tolerance ring 8, while the pressure contact of the projections 81a against the wall surface of the joint portion 52 can reliably fix the carriage 5 and the pivot shaft 7 to each other.

The tolerance ring 8 according to the present embodiment has the projection 81a having a symmetric shape with respect to the plane passing through the center of the projection 81a and parallel to the winding direction, thereby eliminating the need for paying attention to the vertical orientation of the tolerance ring 8 during assembly of the hard disk device 1 and thus improving the operation efficiency.

The tolerance ring 8 described above is curved such that the radius of curvature continuously (gradually) reduces in the direction from the part other than the ends toward the ends 82, 83. However, the tolerance ring 8 may be curved in two stages of the radius of curvature at the ends and the radius of curvature at the part other than the ends.

If the number of projections is large or if adjacent projections overlap with each other when the length of the projection in the winding direction of the tolerance ring is long, the adjacent projections 81a may overlap with each other. Here, the projections 81a differ at least in the position of the center.

In the foregoing embodiment, the strip portion 811 of the projection 81a extends in the winding direction. However, the strip portion 811 may extend in the width direction. In this case, the outer edge (the edge in the width direction) of the strip portion on the main surface side (the side continuous with the main surface) of the tolerance ring (base) is formed in an arc shape. In this case, the cross section cut along the plane vertical to the main surface of the base 80 of the tolerance ring and parallel to the winding direction has such a shape, for example, as illustrated in FIG. 7, and the cross section cut along the plane vertical to the main surface of the base 80 and parallel to the width direction orthogonal to the winding direction has such a shape, for example, as illustrated in FIG. 9.

In the foregoing embodiment, the outer edge (the edge in the winding direction) of the strip portion 811 that is continuous to the main surface of the base 80 is formed in a linear shape in the direction orthogonal to the winding direction. However, the direction in which the linear shape extends may be inclined with respect to the winding direction.

Figure 14:
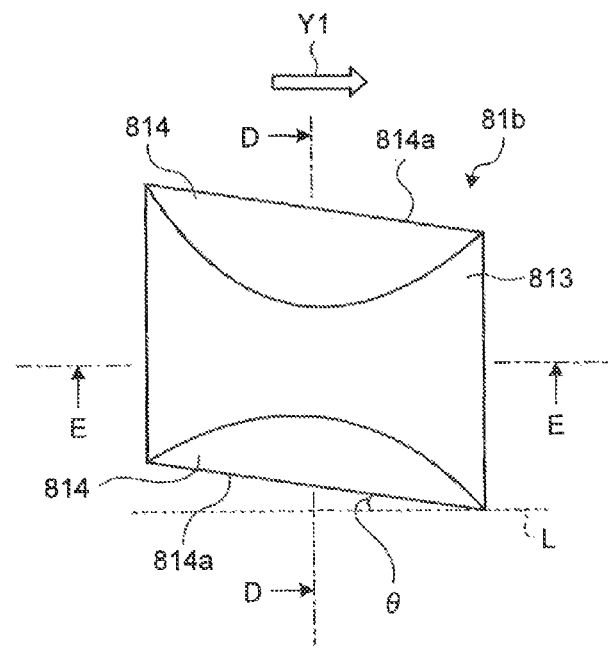
FIG. 14 is a plan view illustrating the configuration of the main part of the tolerance ring according to a first modification of the embodiment of the present invention.
Figure 15:
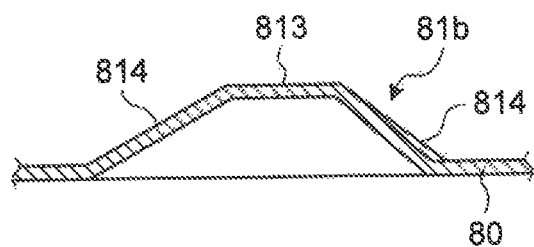
FIG. 15 is a cross-sectional view along line D-D in FIG. 14.
Figure 16:
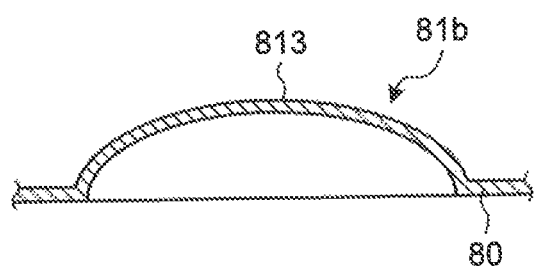
FIG. 16 is a cross-sectional view along line E-E in FIG. 14.

FIG. 14 is a plan view illustrating the configuration of the main part of the tolerance ring 8 according to a first modification of the present embodiment. FIG. 15 is a cross-sectional view along line D-D in FIG. 14. FIG. 16 is a cross-sectional view along line E-E in FIG. 14. In the foregoing embodiment, the edge of the projection 81a in the width direction orthogonal to the winding direction of the tolerance ring 8 is formed in an arc shape. However, any edge can be applied as long as it can gradually come into contact with the front end of the pivot shaft 7. For example, a projection 81b in the first modification illustrated in FIG. 14 is shaped like a parallelogram having edges 814a inclined by an angle θ (0°<θ<90°) with respect to the winding direction (arrow Y1).

As illustrated in FIG. 14, the projection 81b has a strip portion 813 that is shaped like a strip having a width reduced toward the center, extends in the winding direction of the tolerance ring 8, and is curved to be convex in the radial direction of the tolerance ring 8, and joint portions 814 that are approximately shaped like a flat plate and each join the end in the direction vertical to the direction in which the strip portion 813 extends to the main surface of the tolerance ring 8. Here, the edge 814a of the joint portion 814 on the main surface side of the tolerance ring 8 is formed in a linear shape inclined by an angle θ with respect to a line L parallel to the winding direction. The outer edge (the edge in the winding direction) of the strip portion 813 on the main surface side of the tolerance ring 8 is formed in a linear shape vertical to the winding direction.

Here, the cross section cut along the plane vertical to the main surface of the tolerance ring 8 and parallel to or vertical to the winding direction has a trapezoidal or spherical shape as in the foregoing embodiment (see FIGS. 15 and 16).

The projection 81b described above has a linear shape inclined by an angle θ with respect to a line L parallel to the winding direction thereby gradually coming into contact with the front end of the pivot shaft 7. This can suppress the peak load when the pivot shaft 7 is press-fitted in the tolerance ring 8. Since the insertion load can be set by adjusting the protruding shape of the projection 81b, the load exerted to fix the pivot shaft 7 and the tolerance ring 8 can be maintained.

According to the first modification, similar to the present embodiment described above, in the projection 81b protruding in the radial direction from the main surface of the tolerance ring 8, the edge 814a of the projection 81b in the winding direction of the tolerance ring 8 is formed in a linear shape inclined by an angle θ with respect to the winding direction of the tolerance ring 8, so that the peak load can be suppressed when the pivot shaft 7 is press-fitted into the tolerance ring 8, while the load applied to the pivot shaft 7 by the tolerance ring 8 can be maintained in a state in which the tolerance ring 8 and the pivot shaft 7 are fixed to each other. The first modification also can prevent damage (contamination) to the wall surface of the pivot shaft 7 and/or the tolerance ring 8 due to the peak load.

Figure 17:
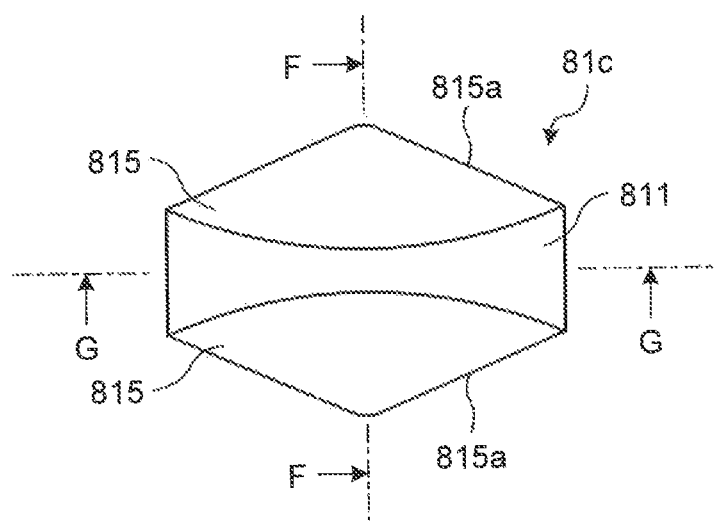
FIG. 17 is a plan view illustrating the configuration of the main part of the tolerance ring according to a second modification of the embodiment of the present invention.
Figure 18:
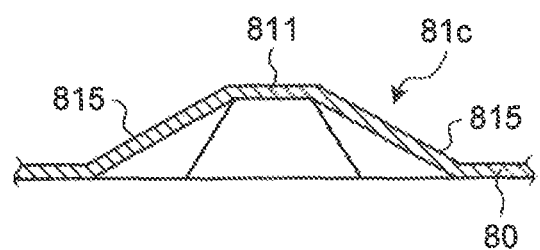
FIG. 18 is a cross-sectional view along line F-F in FIG. 17.
Figure 19:
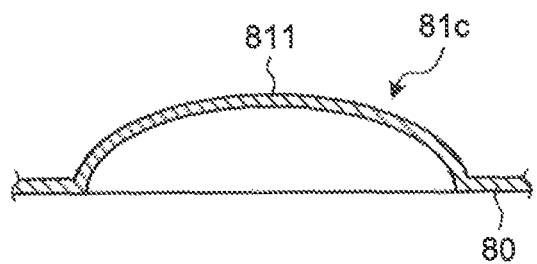
FIG. 19 is a cross-sectional view along line G-G in FIG. 17.

FIG. 17 is a plan view illustrating the configuration of the main part of the tolerance ring 8 according to a second modification of the present embodiment. FIG. 18 is a cross-sectional view along line F-F in FIG. 17. FIG. 19 is a cross-sectional view along line G-G in FIG. 17. In the foregoing embodiment, the edge of the projection 81a in the width direction orthogonal to the winding direction of the tolerance ring 8 is formed in an arc shape. However, a projection 81c in the second modification illustrated in FIG. 16 is formed such that an edge 815a of the projection 81c is inclined in the shape of a letter V.

As illustrated in FIG. 17, the projection 81c has a strip portion 811 as described above and joint portions 815 that are approximately shaped like a flat plate and each join the end in the direction vertical to the direction in which the strip portion 811 extends to the main surface of the tolerance ring 8. Here, the edge 815a of the joint portion 815 on the main surface side of the tolerance ring 8 is shaped like a letter V that terminates at both ends of the strip portion 811.

Here, the cross section cut along the plane vertical to the main surface of the tolerance ring 8 and parallel to or vertical to the winding direction has a trapezoidal or spherical shape as in the foregoing embodiment (see FIGS. 18 and 19).

In the projection 81c described above, the edge 815a of the joint portion 815 is shaped like a letter V that terminates at both ends of the strip portion 811, thereby gradually coming into contact with the front end of the pivot shaft 7. This can suppress the peak load when the pivot shaft 7 is press-fitted in the tolerance ring 8. Since the insertion load can be set by adjusting the protruding shape of the projection 81c, the load exerted to fix the pivot shaft 7 and the tolerance ring 8 can be maintained.

According to the second modification, similar to the foregoing embodiment, in the projection 81c protruding in the radial direction from the main surface of the tolerance ring 8, the edge 815a of the projection 81c in the winding direction of the tolerance ring 8 is shaped like a letter V that terminates at both ends of the strip portion 811, so that the peak load can be suppressed when the pivot shaft 7 is press-fitted into the tolerance ring 8, while the load applied to the pivot shaft 7 by the tolerance ring 8 can be maintained in a state in which the tolerance ring 8 and the pivot shaft 7 are fixed to each other. The second modification can prevent damage (contamination) to the wall surface of the pivot shaft 7 and/or the tolerance ring 8 due to the peak load.

Figure 20:
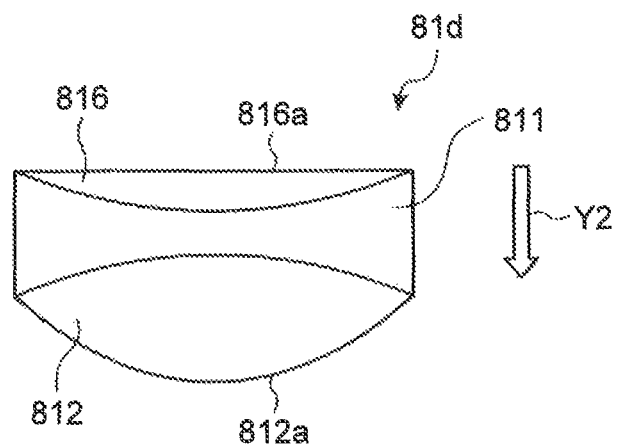
FIG. 20 is a plan view illustrating the configuration of the main part of the tolerance ring according to a third modification of the embodiment of the present invention.

FIG. 20 is a plan view illustrating the configuration of the main part of the tolerance ring 8 according to a third modification of the present embodiment. A projection 81d according to the third modification has a strip portion 811 described above, a joint portion 812 as described above that is approximately shaped like a flat plate and joins one of the ends in the direction vertical to the direction in which the strip portion 811 extends to the main surface of the tolerance ring 8, and a joint portion 816 that is approximately shaped like a flat plate and joins the other end in the direction vertical to the direction in which the strip portion 811 extends to the main surface of the tolerance ring 8. Here, an edge 816a of the joint portion 816 on the main surface side of the tolerance ring 8 is formed in a linear shape that terminates at both ends of the other side (the side different from the side on which the joint portion 812 is disposed) in the longitudinal direction of the strip portion 811.

The foregoing embodiment and the first and second modifications have joint portions having the same shape and symmetric with respect to the center line in the longitudinal direction of the strip portion (the axis in the direction parallel to the direction in which the tolerance ring 8 is wound). However, as in the third modification, one of the outer edges may be shaped like an arc or inclined, and the joint portions may have different shapes with respect to the strip portion. In the projection 81*d* described above, the joint portion 812 is disposed on the front end side in the insertion direction (arrow Y2). As in the third modification, any joint portion can be applied as long as at least the edge on the front end side in the insertion direction has a shape orthogonal to the winding direction.

Figure 21:
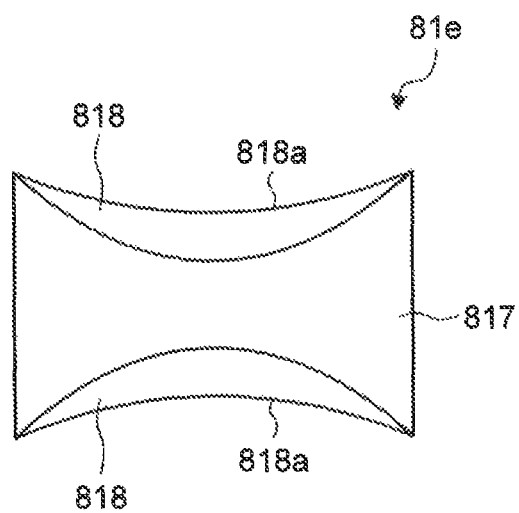
FIG. 21 is a plan view illustrating the configuration of the main part of the tolerance ring according to a fourth modification of the embodiment of the present invention.

FIG. 21 is a plan view illustrating the configuration of the main part of the tolerance ring 8 according to a fourth modification of the present embodiment. A projection 81*e* according to the fourth modification has a strip portion 817 that is shaped like a strip having a width reduced toward the center, extends in the winding direction, and is curved to be convex in the radial direction of the tolerance ring 8, and joint portions 818 that are approximately shaped like a flat plate and each join the end in the direction vertical to the direction in which the strip portion 817 extends to the main surface of the tolerance ring 8. Here, an edge 818*a* of the joint portion 818 on the tolerance ring 8 side is formed in an arc shape that is convex toward the strip portion 817. The outer edge (the edge in the winding direction) of the strip portion 817 on the main surface side of the tolerance ring 8 is formed in a linear shape.

The foregoing fourth modification also enables gradual contact with the front end of the pivot shaft 7. Accordingly, the peak load can be suppressed when the pivot shaft 7 is press-fitted into the tolerance ring 8, while the load applied to the pivot shaft 7 by the tolerance ring 8 can be maintained in a state in which the tolerance ring 8 and the pivot shaft 7 are fixed to each other. The fourth modification can prevent damage (contamination) to the wall surface of the pivot shaft 7 and/or the tolerance ring 8 due to the peak load.

Figure 22:
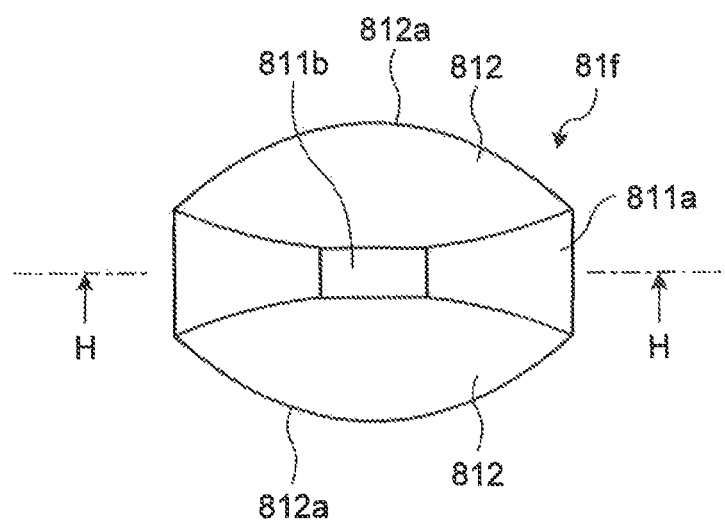
FIG. 22 is a plan view illustrating the configuration of the main part of the tolerance ring according to a fifth modification of the embodiment of the present invention.
Figure 23:
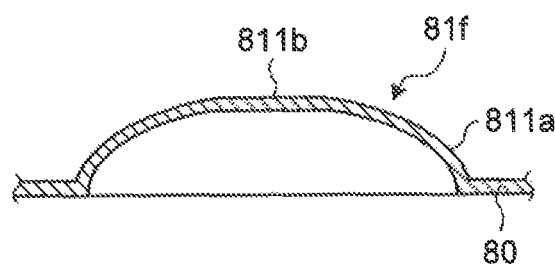
FIG. 23 is a cross-sectional view along line H-H in FIG. 22.

FIG. 22 is a plan view illustrating the configuration of the main part of the tolerance ring 8 according to a fifth modification of the present embodiment. FIG. 23 is a cross-sectional view along line H-H in FIG. 22. A projection 81*f* according to the fifth modification has a strip portion 811*a* that is shaped like a strip having a width reduced toward the center, extends in the winding direction, and is curved to be convex in the radial direction of the tolerance ring 8, and two joint portions 812 described above. Here, the strip portion 811*a* is provided with a flat surface 811*b* parallel to the main surface of the tolerance ring 8 at the center (the front end of the projection 81*f*) in the longitudinal direction of the strip. The flat surface 811*b* is formed by a press or other means. The outer edge (the edge in the winding direction) of the strip portion 811*a* on the main surface side of the tolerance ring 8 is formed in a linear shape.

The flat surface formed along the carriage 5 at the portion in contact with the carriage 5 as in the projection 81*f* in the fifth modification can further stabilize the pressure-contact state against the carriage 5.

It should be noted that the projections 81*b* to 81*f* according to the first to fifth modifications preferably satisfy the relation of the diameter d1<the diameter d2 as described above.

Figure 24:
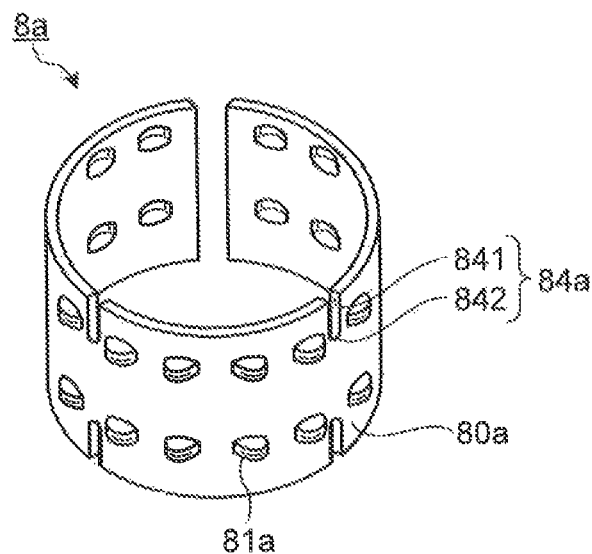
FIG. 24 is a perspective view illustrating the configuration of the tolerance ring according to a sixth modification of the embodiment of the present invention.

FIG. 24 is a perspective view schematically illustrating the configuration of a tolerance ring 8*a* in the hard disk device 1 according to a sixth modification of the present embodiment. The tolerance ring 8*a* according to the sixth modification has two notches 84*a* cut in the width direction orthogonal to the winding direction (and the plate thickness direction), in addition to the projections 81*a* as described above. The notch 84*a* has an extension 841 extending in the width direction from the base end (the end in the direction orthogonal to the winding direction and the plate thickness direction) of the base 80*a*, and a front end 842 provided on the end side different from the base end side of the extension 841 and formed in an arc shape having a predetermined diameter (radius of curvature). The front end 842 is formed in an arc shape having a predetermined diameter. This diameter (diameter of curvature) is equivalent to the width in the winding direction of the extension 841.

Here, in the conventional tolerance ring, when the pivot shaft is inserted into the inside of the tolerance ring fitted in the carriage, the diameter of the tolerance ring is increased along the diameter of the pivot shaft when the pivot shaft approaches the position where the projection is formed. At this point of time, the ring diameter of the tolerance ring produced by the base end on the pivot shaft insertion side increases, and the ring diameter produced by the other base end reduces in reaction thereto. When the diameter changes at both ends of the tolerance ring in this manner, the base end on the opposite side to the insertion side comes off. When the pivot shaft is further inserted in this state and the insertion is completed, the axis of the carriage is rotated and inclined relative to the center axis of the pivot shaft. This affects the assemble accuracy of the drive mechanism.

By contrast, the sixth modification as described above has the notches 84*a* cut in the direction orthogonal to the winding direction (and the plate thickness direction) of the base 80*a* of the tolerance ring 8*a*. Accordingly, even when the diameter of the ring produced by the base end of the tolerance ring 8*a* on the pivot shaft 7 insertion side increases when the pivot shaft 7 is inserted into the inside of the tolerance ring 8*a* and the pivot shaft 7 approaches the projection 81*a*, the base end on the opposite side to the insertion side can be prevented from coming off in response to the diameter increase, thereby suppressing rotation of the carriage 5 relative to the pivot shaft 7. This allows the drive mechanism in the hard disk device 1 to be assembled accurately.

Figure 25:
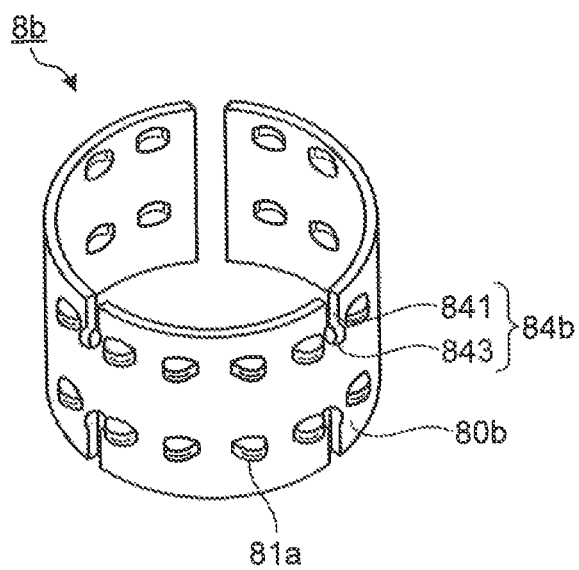
FIG. 25 is a perspective view illustrating the configuration of the tolerance ring according to a seventh modification of the embodiment of the present invention.

FIG. 25 is a perspective view schematically illustrating the configuration of a tolerance ring 8*b* in the hard disk device 1 according to a seventh modification of the present embodiment. In the foregoing sixth modification, the diameter of the curve at the front end 842 is equivalent to the width in the winding direction of the extension 841. However, a notch 84*b* may have a front end 843 with a diameter larger than the width of the extension 841 in the winding direction of the base 80*b*, as in the tolerance ring 8*b* illustrated in FIG. 25.

Figure 26:
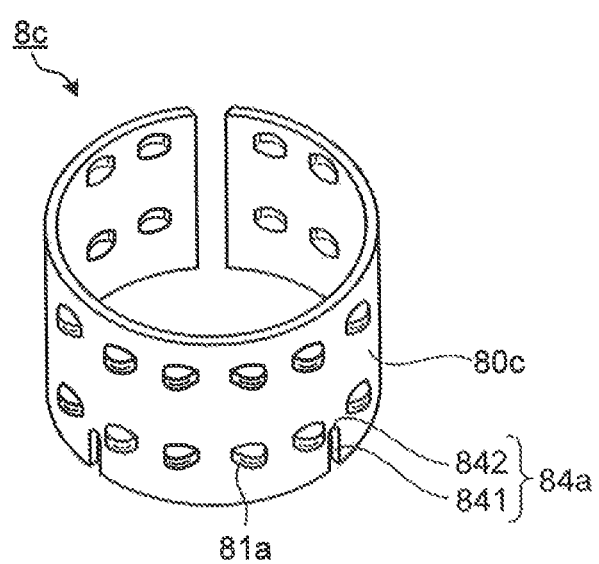
FIG. 26 is a perspective view illustrating the configuration of the tolerance ring according to an eighth modification of the embodiment of the present invention.
Figure 27:
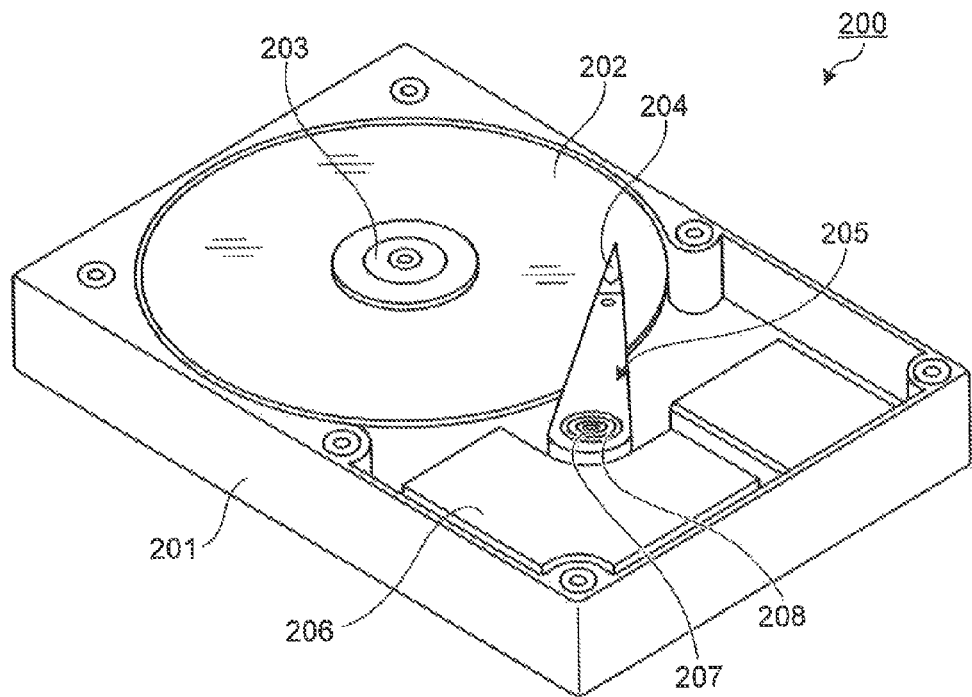
FIG. 27 is a perspective view illustrating the overall configuration of a conventional hard disk device.
Figure 28:
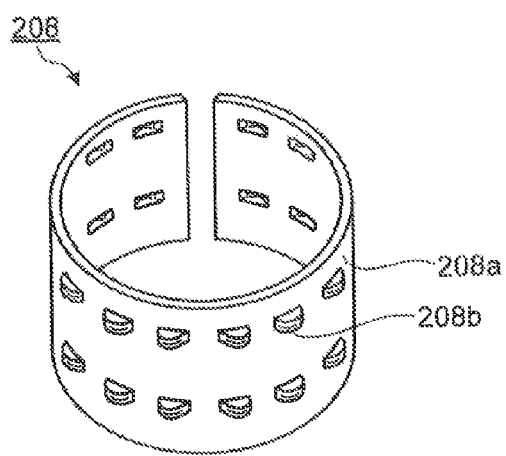
FIG. 28 is a perspective view illustrating the configuration of a tolerance ring in the conventional hard disk device.
Figure 29:
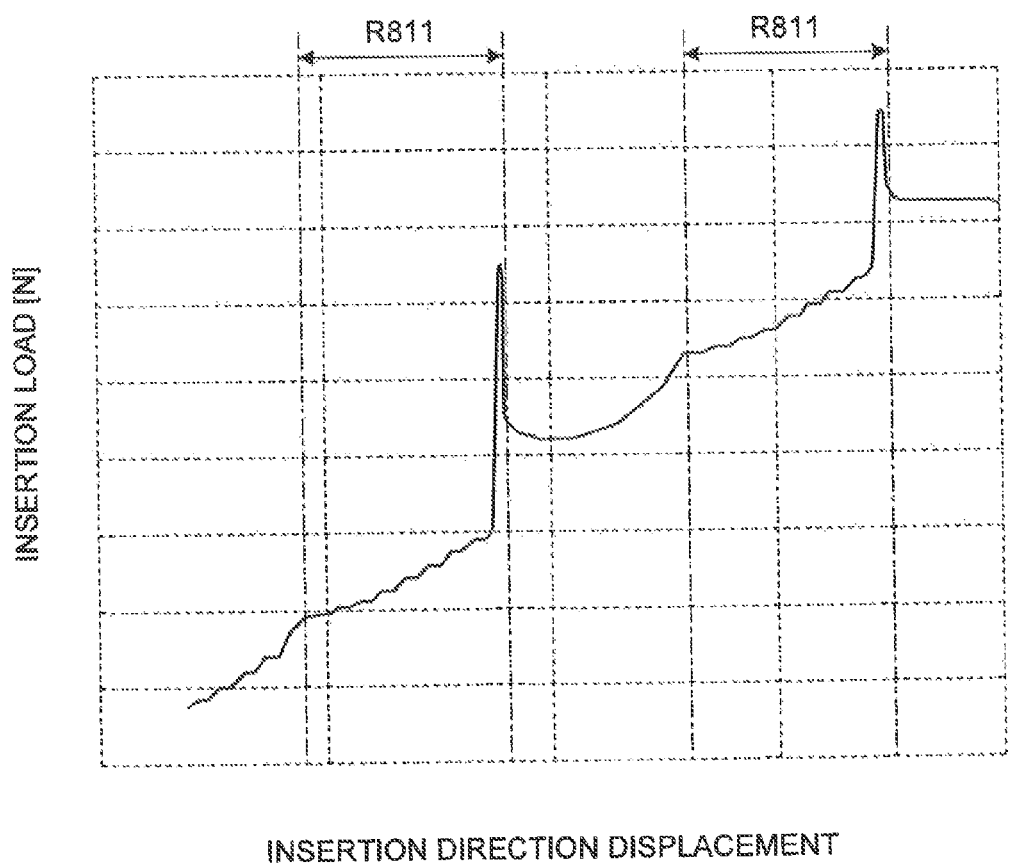
FIG. 29 is a graph illustrating a relation between displacement in the insertion direction and insertion load during insertion of the pivot shaft into the tolerance ring in the conventional hard disk device.
Figure 30:
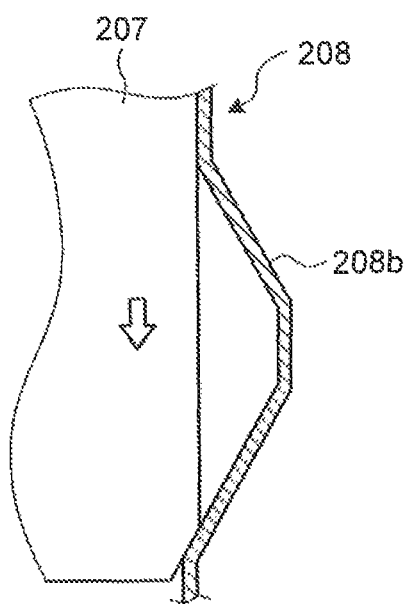
FIG. 30 is a diagram illustrating the configuration of the main part of the conventional hard disk device.

FIG. 26 is a perspective view schematically illustrating the configuration of a tolerance ring 8*c* in the hard disk device 1 according to an eighth modification of the present embodiment. In the foregoing sixth and seventh modifications, the notches 84*a*, 84*b* are provided on both of the base ends of the tolerance ring. However, one or more (two in the present eighth modification) notches 84*a* may be provided on one of the base ends of the base 80*c*, as in the tolerance ring 8*c* illustrated in FIG. 26. In this case, the base end provided with the notch 84a is preferably on the side different from the pivot shaft 7 insertion side of the tolerance ring 8c.

When the notch 84a is provided on one end side as in the tolerance ring 8c according to the eighth modification, the notch is provided at the base end on the side different from the pivot shaft 7 insertion side of the tolerance ring 8c, thereby achieving further greater effect of suppressing rotation of the carriage 5. Specifically, when a notch of 1.0 mm in length is formed in the width direction (the direction orthogonal to the winding direction), the effect of suppressing rotation of the carriage 5 is further greater when a notch of 1.0 mm is formed on one end (the edge on the side different from the pivot shaft 7 insertion side) than when notches of 0.5 mm are formed on both ends.

It is preferable that one or more notches be provided at a position where the longitudinal side is equally divided. When a plurality of notches are provided, the lengths (the lengths in the direction orthogonal to the longitudinal direction of the tolerance ring) of the extensions 841 may be equal to each other or may be different from each other.

INDUSTRIAL APPLICABILITY

As described above, the tolerance ring according to the present invention is useful for suppressing the peak load when the pivot shaft is press-fitted in the tolerance ring and for maintaining the load applied to the pivot shaft by the tolerance ring in a state in which the tolerance ring and the pivot shaft are fixed to each other.

REFERENCE SIGNS LIST 1, 200 hard disk device
2, 201 casing body
3, 202 hard disk
4, 203 spindle
5, 205 carriage
6, 206 VCM
7, 207 pivot shaft
8, 8a, 8b, 8c, 208 tolerance ring
50 magnetic head unit
50a suspension
50b, 204 magnetic head
51 arm
52 joint portion
60 coil
61 magnet
80, 80a, 80b, 80c, 208a base
81a, 81b, 81c, 81d, 81e, 81f, 208b projection
82, 83 end
84a, 84b notch
811, 811a, 813, 817 strip portion
812, 814, 814, 815, 816, 818 joint portion
812a, 814a, 815a, 816a, 818a edge
811b flat surface
841 extension
842, 843 front end

The invention claimed is:

1. A tolerance ring comprising:
   a base formed of a strip-shaped member approximately wound around into a ring shape; and
   a plurality of projections aligned in at least one row along a winding direction of the base so as to protrude in a radial direction from an outer peripheral surface of the base,
   wherein each of the projections has a pair of opposing edges extending in the winding direction and a pair of opposing edges extending in a width direction orthogonal to the winding direction each of which serves as a boundary between the projection and the base, each projection being deformed outwards from the base of the ring, forming a continuous projection member,
   wherein each projection includes:
   a strip portion shaped like a strip, longitudinally-extending in the winding direction, and curved to be convex in the radial direction, the strip portion comprising a pair of opposing front and rear edges extending in the width direction adjoining the base, and a pair of opposing arcuate-shaped longitudinally-extending edges extending in the winding direction; and
   a pair of opposing side joint portions each approximately shaped like a flat plate and comprising an edge adjoining a respective one of the longitudinally-extending edges of the strip portion, and an arcuate-shaped longitudinally-extending base edge extending in the winding direction adjoining the base,
   wherein the opposing side joint portions of the projection each continuously extend between a respective one of the opposing longitudinally-extending edges of strip portion and a respective one of the arcuate-shaped longitudinally extending base edges and between the front and rear edges of the projection.

2. The tolerance ring according to claim 1, wherein each projection has different kinds of shapes between a cross section cut along a radially-extending plane perpendicular to the outer peripheral surface of the base and parallel to the winding direction and a cross section cut along a radially extending plane perpendicular to the outer peripheral surface of the base and parallel to the width direction.

3. The tolerance ring according to claim 1, wherein the front and rear edges of each projection in the winding direction is formed in a linear shape orthogonal to the winding direction.

4. The tolerance ring according to claim 1, wherein each projection has a symmetric shape with respect to a plane passing through a center of the projection and parallel to the winding direction.

5. The tolerance ring according to claim 1, wherein a maximum length of each projection in the winding direction is larger in a plate-shaped flat surface than a maximum height in the radial direction from the outer peripheral surface of the base.

6. The tolerance ring according to claim 1, wherein a radius of curvature at an end in the winding direction of the base is smaller than a radius of curvature at a part other than the end in the winding direction.

7. The tolerance ring according to claim 6, wherein the radius of curvature continuously reduces in a direction from the part other than the end toward the end.

8. The tolerance ring according to claim 1, wherein the tolerance ring includes a notch cut in the width direction from at least one of ends in the width direction of the base.

9. The tolerance ring according to claim 8, wherein one or more notches are provided at the one end.

10. The tolerance ring according to claim 1, wherein, of the projections arranged along the winding direction, the number of the projections arranged in a row is a multiple of three.

11. The tolerance ring according to claim 10, wherein the projections form a plurality of rows along the winding direction.

* * * * *